United States Patent
Petack

(10) Patent No.: US 9,169,078 B2
(45) Date of Patent: Oct. 27, 2015

(54) DRIVING DRUM, DEFLECTING DRUM, AND TENSIONING DRUM FOR BELT CONVEYORS

(75) Inventor: Burkhard Petack, Senftenberg (DE)

(73) Assignee: TAKRAF GMBH, Leipzig (DE)

( * ) Notice: Subject to any disclaimer, the term of this patent is extended or adjusted under 35 U.S.C. 154(b) by 246 days.

(21) Appl. No.: 13/990,179

(22) PCT Filed: Aug. 17, 2011

(86) PCT No.: PCT/DE2011/001629
§ 371 (c)(1),
(2), (4) Date: May 29, 2013

(87) PCT Pub. No.: WO2012/075976
PCT Pub. Date: Jun. 14, 2012

(65) Prior Publication Data
US 2013/0256098 A1  Oct. 3, 2013

(30) Foreign Application Priority Data
Dec. 11, 2010 (DE) .......................... 10 2010 054 207

(51) Int. Cl.
*B65G 23/04* (2006.01)
*B65G 39/00* (2006.01)

(52) U.S. Cl.
CPC ............... *B65G 39/00* (2013.01); *B65G 23/04* (2013.01)

(58) Field of Classification Search
None
See application file for complete search history.

(56) References Cited

U.S. PATENT DOCUMENTS

| 3,074,288 | A |   | 1/1963 | Newton |
|---|---|---|---|---|
| 4,181,217 | A | * | 1/1980 | Huls et al. ..................... 198/842 |
| 5,899,321 | A |   | 5/1999 | El-Ibiary |
| 2002/0108841 | A1 |   | 8/2002 | Roessler et al. |

FOREIGN PATENT DOCUMENTS

| BE | 557 443 A | 5/1957 |
|---|---|---|
| DE | 19 30 381 U | 12/1965 |
| DE | 20 53 652 A1 | 5/1972 |
| DE | 101 11 311 C2 | 4/2003 |
| DE | 10 2007 018 689 A1 | 10/2008 |
| GB | 898 165 A | 6/1962 |
| JP | 2007 186 342 A | 7/2007 |

OTHER PUBLICATIONS

Dubbel interaktiv 2.0, Das elektronische Taschenbuch für den Maschinenbau, Springer: Berlin/Heidelberg 2002, Section U 3.2.3 Konstruktionselemente und Baugruppen für Stetigforderer.

* cited by examiner

*Primary Examiner* — Kavel Singh
(74) *Attorney, Agent, or Firm* — McGlew and Tuttle, P.C.

(57) ABSTRACT

The invention relates to the design of driving, deflecting, and tensioning drums for conveyor belts, comprising a one-piece drum jacket or a drum jacket (1) comprising a center drum body (10) and two bearing pieces (11, 12) attached to both sides of the center drum body. All three components of the drum jacket (1) are provided with flanges on the sides facing each other and screwed together at said flanges. Each of the two bearing pieces (11, 12) has an annular bearing seat for rolling-element bearings on the outside. Each of the two rolling-element bearings is accommodated on the outside by a bearing shield (3, 4), wherein the one bearing is a fixed bearing and the other bearing is a floating bearing. In a first embodiment, a direct drive (2), the rotor of which directly drives the drum jacket (1), is provided as a drive. The important advantage provided by the design of the drums according to the invention is that high stability is achieved due to the large diameters of the drum jackets (1) and the large bearings used together with the bearing shields (3, 4).

18 Claims, 8 Drawing Sheets

DRIVING DRUM, DEFLECTING DRUM, AND TENSIONING DRUM FOR BELT CONVEYORS

Figure 1:
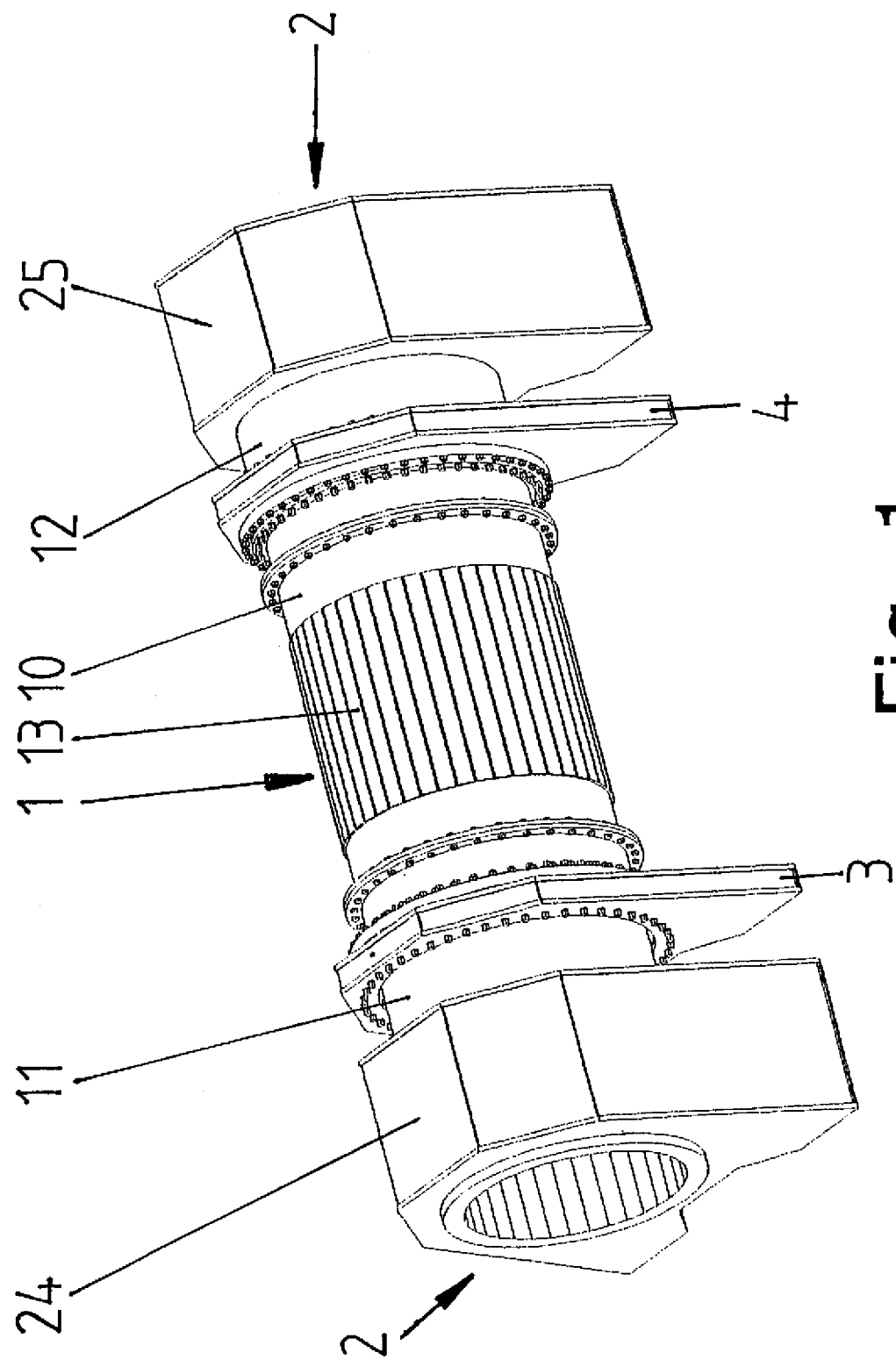

The invention relates to the design of driving drums, deflecting drums and tensioning drums for belt conveyors, comprising a one-piece drum jacket, or a drum jacket comprising a center body and two bearing pieces attached to both its ends.

STATE OF THE ART

Belt conveyors are used in mining for transporting bulk material, such as FOR EXAMPLE overburden and mineral resources. Under such conditions the driving drums and deflecting drums for belt conveyors, particularly those covering long conveying distances stretching over several kilometers, as they are preferably used in open cast mining, have to meet high standards regarding their performance and wear protection.

Driving drums for belt conveyors in their classic form are known from *Dubbel interaktiv* 2.0, Das elektronische Taschenbuch für den Maschinenbau, Springer: Berlin/Heidelberg 2002, Section U 3.2.3 Konstruktionselemente und Baugruppen für Stetigfőorderer (Construction elements and assemblies for continuous conveyors) under the heading *Antriebs-, Spann- und Umlenktrommeln* (Driving drums, tensioning drums and deflecting drums), illustration 13, *Antriebseinheit* (drive unit). The drive unit shown there consists of an electric motor with coupling and plug-in gear. The axle of the driving drum extends into the seating of the plug-in gear. Illustration 15 shows such a driving drum which is set into rotating motion by means of a drive unit attached to both sides. Illustration 14 shows the deformation of a driving drum resulting from high strain. From this it is evident that the drum jacket and the drum axle have different deformation properties. These are compensated by designing both end walls connecting the axle and the drum jacket as a membrane. The deformations of the drum axle are conditioned by its design and must be absorbed and/or compensated by the bearings and the plug-in gear or gears.

Attempts to compensate these deformations by means of a stiffer construction of those structural components particularly affected may lead to crack formation in these new areas of high strain. Another disadvantage is that due to the deformations described, when designing the bearings the technical sustainability must be taken into account. Preferably, spherical roller bearings are used which are very expensive to buy. The technical circumstances described here also apply to the deflecting drums and tensioning drums.

OBJECT OF INVENTION

The object underlying the invention is to design the driving drums, deflecting drums and tensioning drums for belt conveyors in such a manner that the high forces acting on them may be absorbed well by the load-bearing components, causing only little deformation, and may be further transmitted into the bearings.

This object is achieved by designing the basic drum bodies in principle for all three kinds of drum as having only one drum jacket shaped as a hollow cylinder, which is provided at both ends on its outer circumference with bearing seats where the drum jackets are directly accommodated by bearings. As regards their length, these drum jackets may be executed as one piece, or may consist of a center drum body and two outer bearing pieces attached to it on both ends in a joint axis. When executed as driving drum, in addition the drives are connected from the outside.

A bearing piece shaped as a hollow cylinder is attached coaxially to both ends of the center piece of the driving, deflecting or tensioning drum. All three component pieces may have the same or differing outer diameters. Each of the two bearing pieces accommodates on its outside a rolling-element bearing, the inner ring of which is arranged coaxially and secured against rotation at the circumference of the bearing piece, and the outer ring of which is accommodated by a bearing shield. One bearing is a fixed bearing, and the other a floating bearing. The bearing may also be executed as a slide bearing. The center piece and both bearing pieces are provided with matching flanges and screwed together. For certain applications the center piece and the two bearing pieces may be executed as a single element, in which case the flanges are not required. The drum jacket is executed in such a stable design that the prescribed maximum values for deformation are not exceeded. The stability of the drums can be enhanced by increasing the diameter and the wall thickness of the drum jacket and/or by welding in ridges or bulkhead plates within the drum, as well as by reducing the distance between both bearings.

If the device is designed as a driving drum, its rotating movement is transmitted by means of a drive from the outside onto one of the two bearing pieces. Should a higher drive performance be required, a second drive is connected at the other end to the bearing piece situated there. Gearless direct drives or electromechanical drives are used to drive the device. With an electrical direct drive, the rotating rotor is directly connected to the drum jacket or mounted on it. The stator then becomes part of the standing engine housing. The electromechanical drives are connected at the transmission output by an adapter, a coupling, or directly to the front end of the driving drum.

The most substantial advantage arising from the design of the drums according to the invention is that due to the large diameter of the drum jackets and the large bearings used in combination with the bearing shields, a high stability is attained. There is considerably less deflection (sagging) of the components exposed to dynamic strain, compared to the known drums for driving, deflecting and tensioning provided with drum shaft and drum base.

By designing the connection points between center piece and bearing pieces as flanges or as another readily detachable connection, easy assembly and disassembly and economical maintenance of all wear parts are made possible. The clear construction design of the structural components and their connection with each other allows for introduction of customized construction series.

EMBODIMENTS

Figure 2:
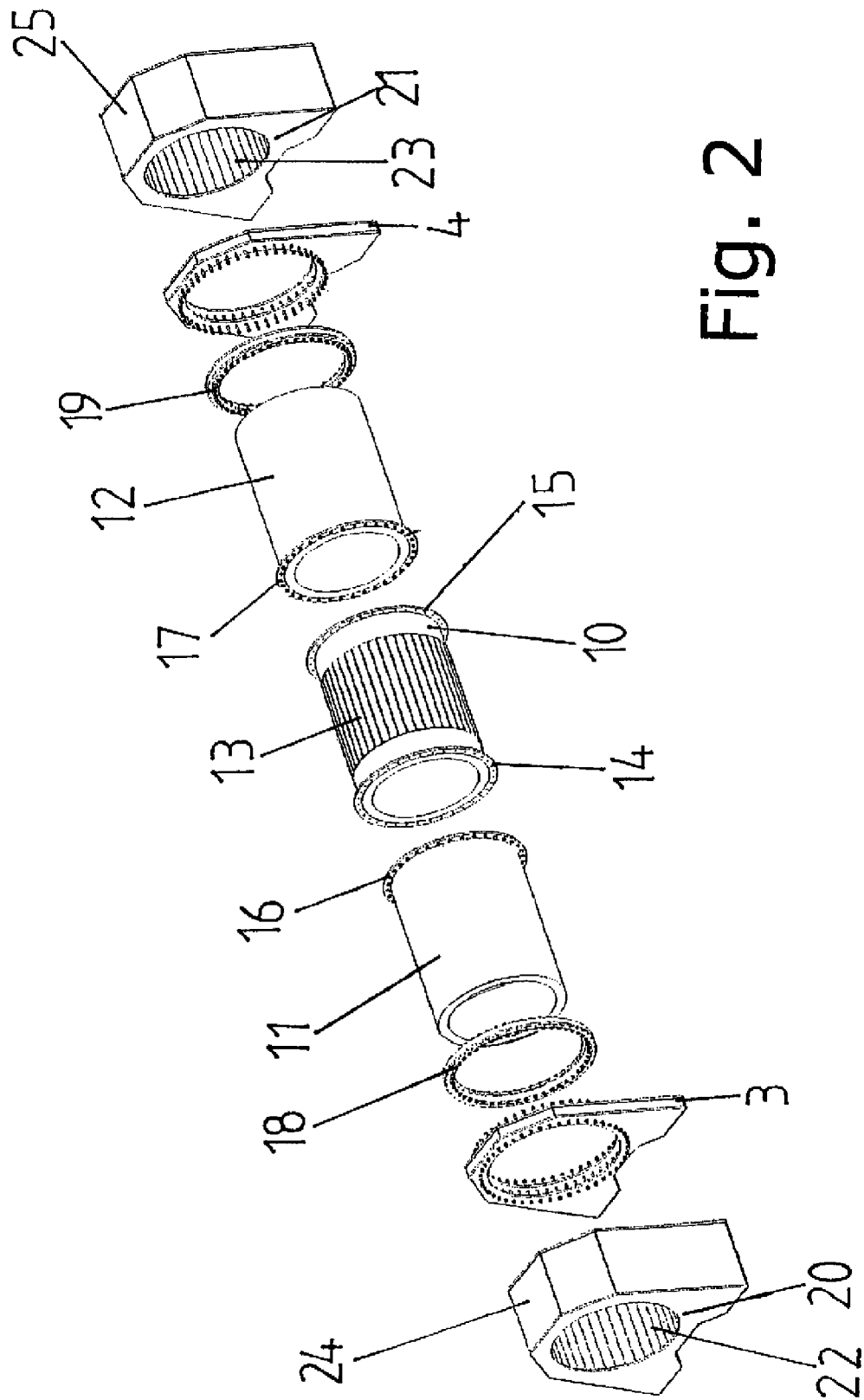
Figure 3:
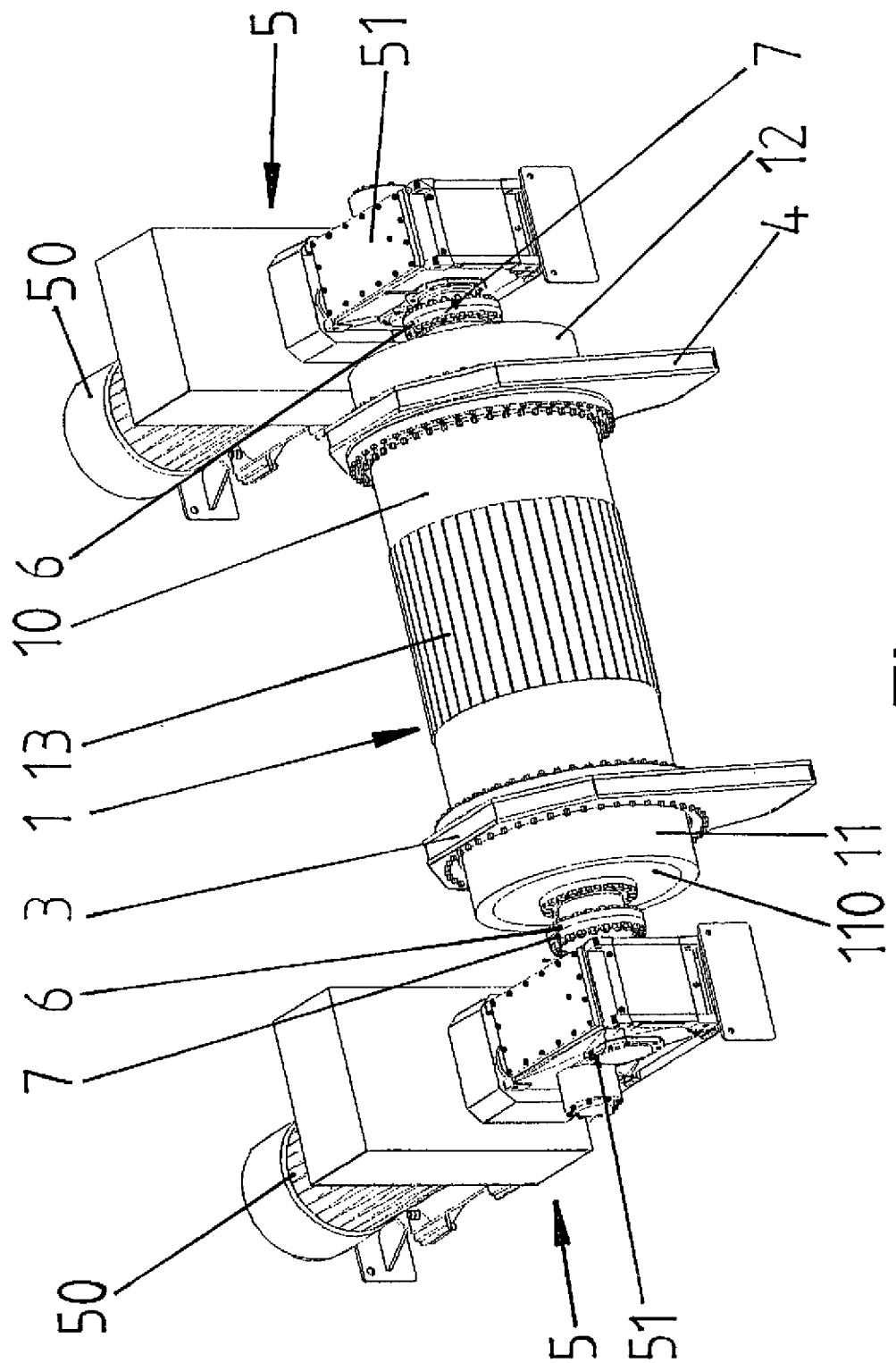
Figure 4:
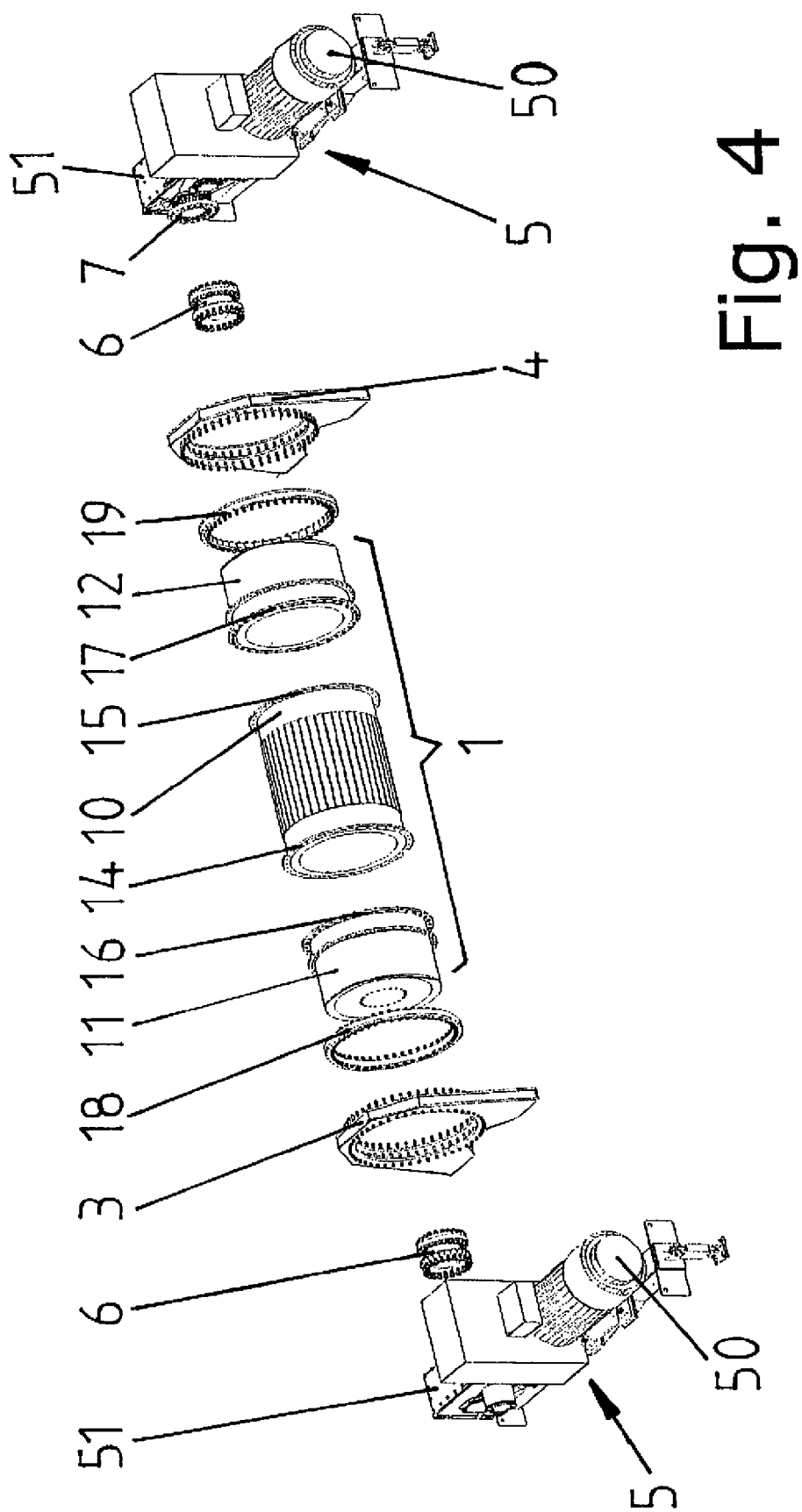
Figure 5:
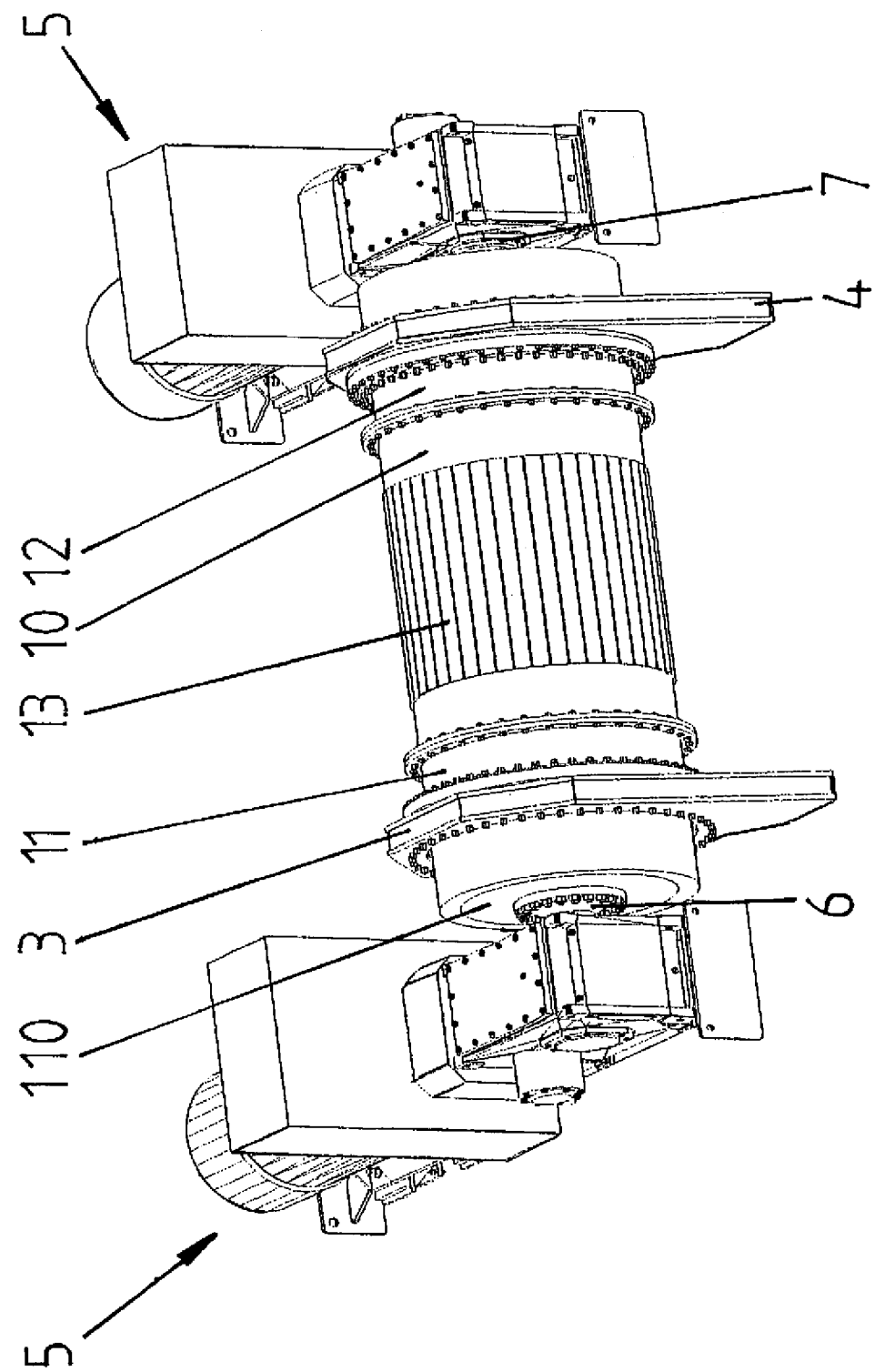
Figure 6:
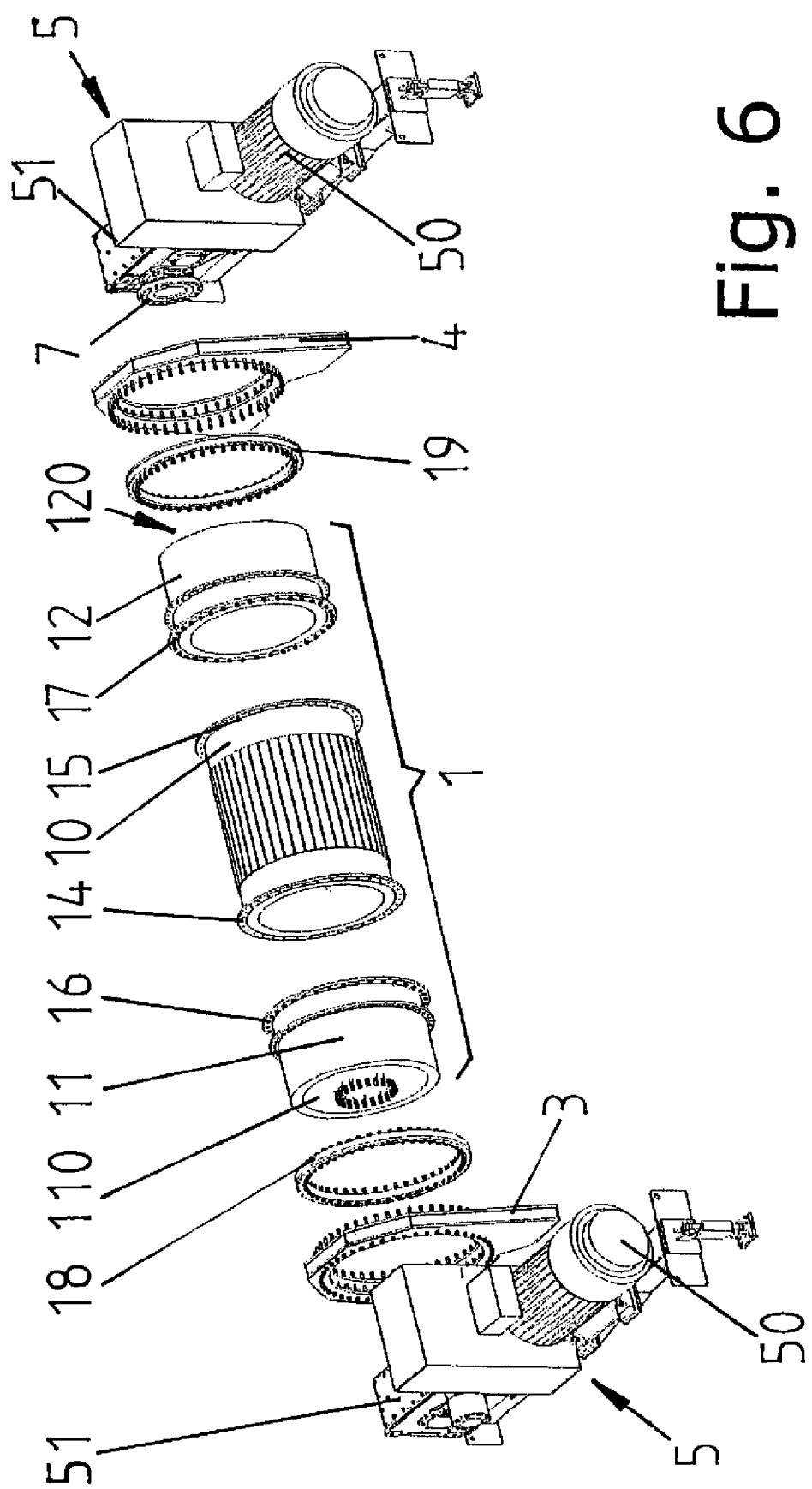
Figure 7:
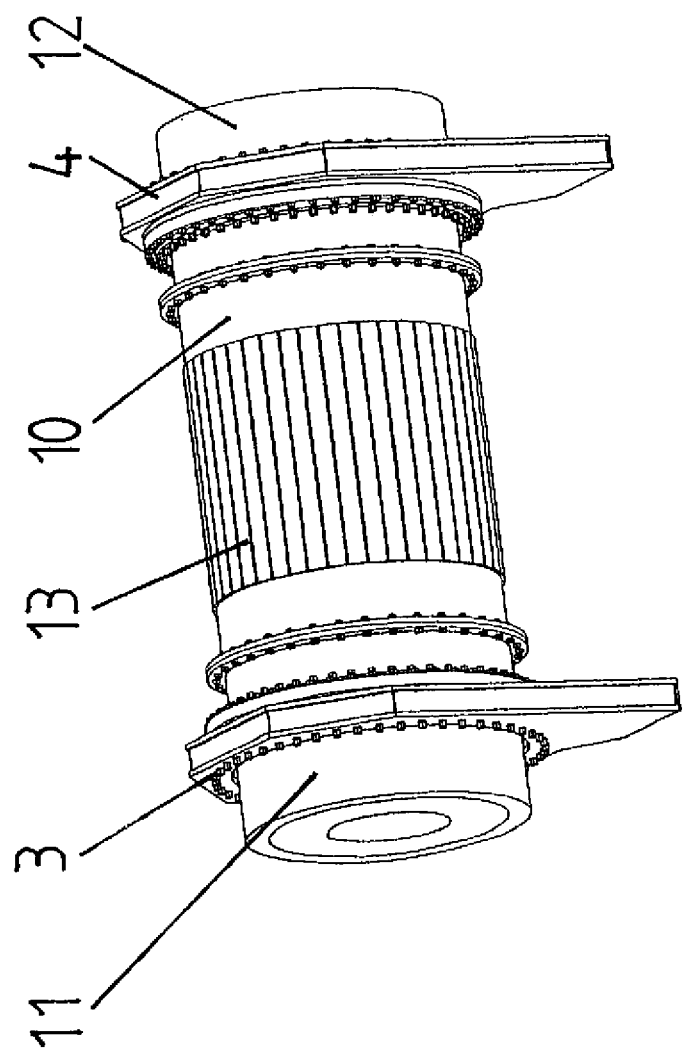
Figure 8:
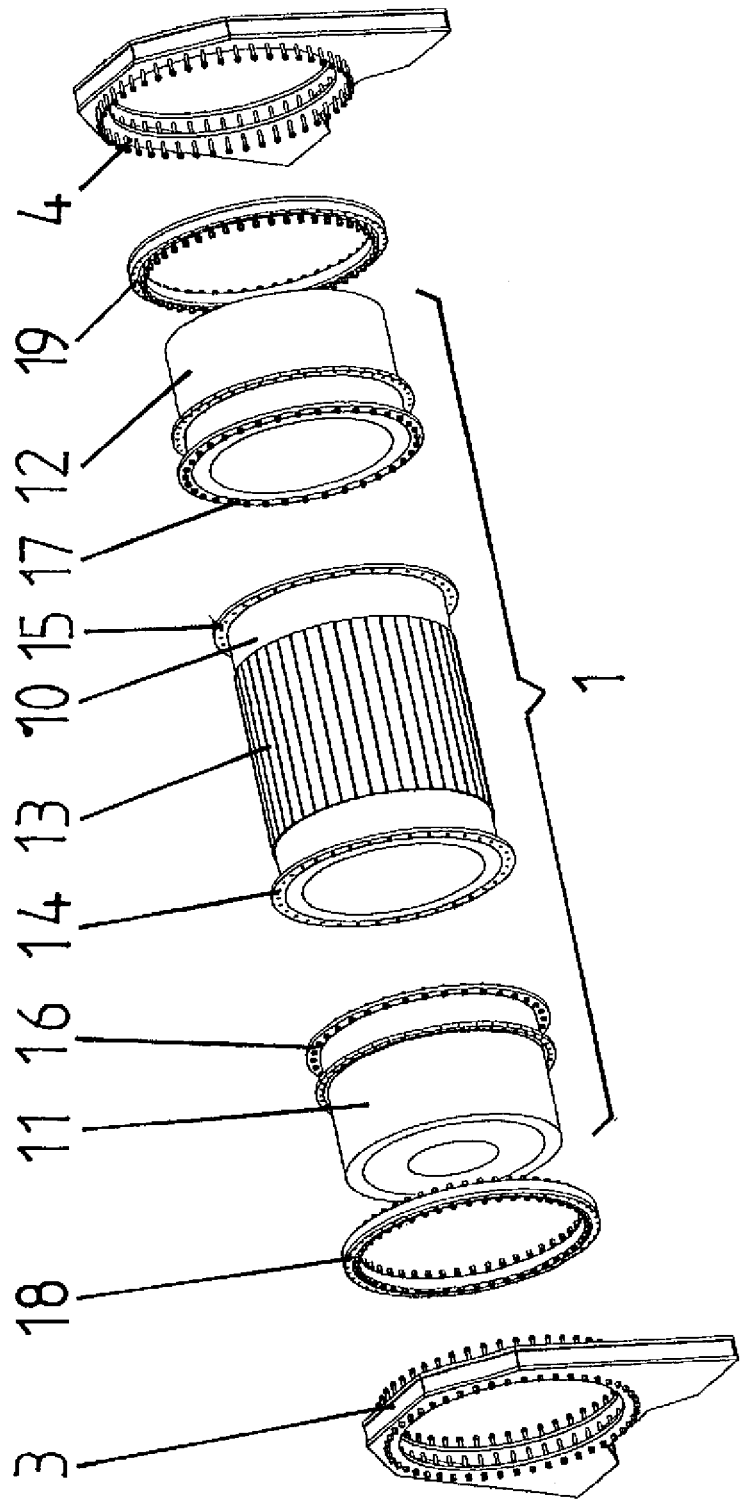

Further details and advantages of the object of invention will become evident from the following description and the corresponding drawings, in which four preferred embodiments for driving drums, deflecting drums and tensioning drums are illustrated. The figures show the following:

FIG. 1 a driving drum having a gearless direct drive in perspective view as the first embodiment, FIG. 2 the driving drum according to FIG. 1 in exploded view, FIG. 3 a driving drum having an electromechanical drive in perspective view as the second embodiment, FIG. 4 the driving drum according to FIG. 3 in exploded view, FIG. 5 a driving drum having flanges and a directly connected electromechanical drive and a drum base without flange in perspective view as the third embodiment, FIG. 6 the driving drum according to FIG. 5 in exploded view, FIG. 7 a deflecting and tensioning drum in perspective view as the fourth embodiment, and FIG. 8 the deflecting and tensioning drum according to FIG. 7 in exploded view.

FIRST EMBODIMENT according to FIGS. 1 and 2, The driving drum for belt conveyors consists of the drum jacket 1 shaped as a hollow cylinder with the center drum body 10 and the bearing pieces 11 and 12 attached to both its ends in a detachable manner. On its outside, the center drum body 10 is provided with a friction lining 13 for slaving the conveyor belt (not illustrated). On each end, the center drum body 10 has one flange 14,15 respectively. Likewise, each of the bearing pieces 11 and 12 is provided with one flange 16, 17 each. At each end of the center drum body 10, one bearing piece 11 and 12 each is screwed on to the flanges, 14 fitting 16, and 15 fitting 17. Both bearing pieces 11 and 12 project into an electrical direct drive 2 attached on both sides. Each of the two direct drives 2 consists of an outer stator 20, 21 and an inner rotor 22, 23. The outer stators 20, 21 are each seated in a housing 24, 25.

Each of the bearing pieces 11 and 12 is provided on its circumference a bearing seat for a rolling-element bearing 18, 19. On the outside, each of the rolling-element bearings 18, 19 is accommodated by a bearing shield 3, 4, whereby one of the two bearings is a fixed bearing, and the other a floating bearing. The housings 24, 25 of the direct drive 2 and the bearing shields 3, 4 are anchored in fixed points. The center drum body 10, the two bearing pieces 11,12 and the direct drive 2 are arranged on a joint axis.

Possible differences in diameter between center drum body 10 and bearing pieces 11,12 may be compensated by means of the flanges 14, 15, 16,17. The resulting construction of the driving drum with the direct drives 2 attached to the outside and the bearings for the drum jacket 1 is considerably more stable than the known driving drums which have drive shafts due to the large diameters involved.

With this design of the drum drive it is possible if required, to arrange a brake disk on the outside, at one or both ends. In the case of belt conveyors exposed to very high strain one further bearing each, provided with a bearing shield, may be intended on the outside beside each of the direct drives 2.

Reference Numbers:
1 Drum jacket, comprising:
10 center drum body
11 bearing piece
12 bearing piece
13 friction lining
14 flange
15 flange
16 flange
17 flange
18 rolling-element bearing
19 rolling-element bearing
2 Direct drive, comprising:
20 stator
21 stator
22 rotor
23 rotor
24 housing
25 housing
3 bearing shield
4 bearing shield

Second Embodiment

In FIGS. 3 and 4 a second embodiment is shown, with a shaftless driving drum 1, with electromechanical drive, consisting of electric motor 50 and gear 51. As above, the center drum body 10 has the bearing pieces 11, 12 flange-mounted on both ends.

These bearing pieces 11, 12 accommodate the rolling-element bearings 18, 19, which, in conjunction with the bearing shields 3, 4 at each end, constitute a fixed bearing on one side, and a floating bearing on the other.

As this design is substantially the same as the construction design of the first embodiment variant, at the end of this second embodiment, instead of repeating the description including the individual parts, only the reference numbers used are shown as overview. However, this second embodiment differs from the first in that the bearing pieces 11, 12 are each provided with a drum base 110, 120 on the outside, and that each of these drum bases 110, 120 is provided with a flange 6. The transmission output shafts are also provided with a flange 7. By connecting the flanges 6,7 of the drum base 110, 120 with those of the transmission output, the rotating motion and the torque are transmitted to the drum jacket 1.

Reference Numbers:
1 Drum jacket, comprising:
10 center drum body
11 bearing piece with 110 drum base
12 bearing piece with 120 drum base
13 friction lining
14 flange
15 flange
16 flange
17 flange
18 rolling-element bearing
19 rolling-element bearing
3 bearing shield
4 bearing shield
5 electromechanical drive, comprising:
50 electric motor
51 gear
6 flange
7 flange

Third Embodiment

The third embodiment of a driving drum illustrated in FIGS. 5 and 6 differs from the second embodiment described above merely in that the transmission output of the electromechanical drive 5 is executed as a flange 6, 7 which is plugged onto the transmission output shaft and is directly screwed centrically to the drum bases 110, 120. It depends on the individual operational conditions whether the electric motor 50 with the gear 51 of the electromechanical drives 5 points in the direction shown according to FIG. 5 or FIG. 6.

Reference Numbers:
1 Drum jacket, comprising:
10 center drum body
11 bearing piece with 110 drum base
12 bearing piece with 120 drum base
13 friction lining
14 flange
15 flange
16 flange 17 flange
18 rolling-element bearing
19 rolling-element bearing
3 bearing shield
4 bearing shield
5 electromechanical drive, comprising:
50 electric motor
51 gear
52 flange
53 flange In these solutions according to the second and third embodiment, high stability is attained, too, due to the large diameters of the drum jacket 1 and of the bearings with the bearing shields 3, 4. There is substantially less deflection (sagging) of the components particularly exposed to strain, compared to the known drum drives with shaft and drum base. This stability can be enhanced further by welded in ridges and/or bulkhead plates in the drum body 10 and into the bearing pieces 11, 12 with the drum base. Due to the detachable flange connections, the center drum body 10 may be easily disassembled if required, the worn friction lining 13 replaced, and the center drum body 10 re-assembled afterwards. If such high driving capacities for the belt conveyor are not required, it is sufficient to intend only one drive. However, using two drives to attain high driving capacities has the advantage of introducing the forces evenly from both sides onto the driving drum, thereby resulting in more favourable load factors.

Fourth Embodiment

The fourth embodiment according to FIGS. 7 and 8 relates to a deflecting or tensioning drum for belt conveyors, the drum jacket 1 of which is in principle designed like the drum drives described above. The drum jacket 1 consists of a center drum body 10, with a bearing piece 11, 12 flange-mounted to it on each end. Each of these two bearing pieces 11, 12 accommodates at its circumference a rolling-element bearing 18, 19, each of which is seated within one bearing shield 3, 4 on its outside.

When executed as tensioning drum, the bearing shields 3, 4 are arranged in a slideable manner in a belt tensioning device in longitudinal direction of the conveyor belt.

Reference Numbers:
1 Drum jacket, comprising:
10 center drum body
11 bearing piece with 110 drum base
12 bearing piece with 120 drum base
13 friction lining
14 flange
15 flange
16 flange
17 flange
18 rolling-element bearing
19 rolling-element bearing
3 bearing shield
4 bearing shield Also in the case of such a deflecting or tensioning drum the drum jacket 1 may be executed in one piece and provided on the outside with a friction lining 13 and two outer seats for one rolling-element bearing 18, 19 each.

Instead of rolling-element bearings 18, 19, in all four embodiments slide bearings may be used.

The invention claimed is:

1. A driving drum for a belt conveyor, the driving drum comprising a drum jacket shaped as a hollow cylinder and mounted in a rotatable manner on both ends and driven either from one or both ends, the drum jacket comprising:
    a center drum body with a first end flange on a first end and a second end flange on a second end;
    a first end bearing piece with a first end bearing piece flange, the first end bearing piece flange being fixed with the first end flange;
    a second end bearing piece with a second end bearing piece flange, the second end bearing piece flange being fixed with the second end flange;
    a first end rolling-element bearing comprising a first end bearing inner ring arranged coaxially and secured against rotation at a circumference of the first end bearing piece and with a first end bearing outer ring;
    a second end rolling-element bearing comprising a second end bearing inner ring arranged coaxially and secured against rotation at a circumference of the second end bearing piece and with a second end bearing outer ring;
    a first end bearing shield accommodating the first end bearing outer ring; and
    a second end bearing shield accommodating the second end bearing outer ring, one of the first end rolling-element bearing and the second end rolling-element bearing being a fixed bearing and the other of the first end rolling-element bearing and the second end rolling-element bearing being a floating bearing and whereby a drive is connected to at least one of the two bearing pieces, the drive or drives and the bearing shields being attached detachably on a joint base, said two bearing pieces and said center drum body having the same outer diameter.

2. A driving drum for a belt conveyor according to claim 1, wherein the drive comprises one of slowly running gearless direct drives and electromechanical drives.

3. A driving drum for a belt conveyor according to claim 1, wherein:
    the first end bearing piece is shaped as a hollow cylinder;
    the second end bearing piece is shaped as a hollow cylinder;
    the drive comprises a first end torque motor and a second end torque motor;
    the first end torque motor comprises a first end motor housing with a first end outside stator and a first end inside rotor;
    the second end torque motor comprises a second end motor housing with a second end outside stator and a second end inside rotor;
    the first end outside stator is attached in a fixed manner with the first end motor housing;
    the second end outside stator is attached in a fixed manner with the second end motor housing;
    the first end inside rotor is attached in a manner secured against rotation and detachably to the first end bearing piece that is shaped as a hollow cylinder; and
    the second end inside rotor is attached in a manner secured against rotation and detachably to the second end bearing piece that is shaped as a hollow cylinder.

4. A driving drum for a belt conveyor according to claim 1, wherein:
    the drive comprise electromechanical drives with a first end quickly running electric motor with a first end connected gear having a transmission output operably connected to the first end bearing piece and a second end quickly running electric motor with a second end connected gear having a transmission output operably connected to the second end bearing piece;

the first end connected gear is operably connected to the first end bearing piece by one of a connecting piece, a flange plugged onto the transmission output, and a coupling; and the second end connected gear is operably connected to the second end bearing piece by one of a connecting piece, a flange plugged onto the transmission output, and a coupling

5. A driving drum for a belt conveyor according to claim 1, wherein the drum jacket further comprises an inside reinforcement comprising at least one of welded ridges and bulkhead plates.

6. A driving drum for a belt conveyor according to claim 1, wherein the center drum body comprises an outside provided with a friction lining forming a running surface of a conveyor belt strap

7. A driving drum for a belt conveyor according to claim 1, wherein the drum jacket is one integral piece.

8. A deflecting drum and tensioning drum for belt conveyors, the drum comprising a drum jacket comprising:
   a center drum body with a first end flange on a first end and a second end flange on a second end, said center drum body comprising a center drum body outer diameter;
   a first end bearing piece with a first end bearing piece flange, the first end bearing piece flange being fixed with the first end flange, said first end bearing piece comprising a first end bearing piece outer diameter;
   a second end bearing piece with a second end bearing piece flange, the second end bearing piece flange being fixed with the second end flange, said second end bearing piece comprising a second end bearing piece outer diameter, said center drum body outer diameter being equal to said first end bearing piece outer diameter and said second end bearing piece outer diameter, said first end bearing piece outer diameter being equal to said second end bearing piece outer diameter;
   a first end rolling-element bearing comprising a first end bearing inner ring arranged coaxially and secured against rotation at a circumference of the first end bearing piece and with a first end bearing outer ring;
   a second end rolling-element bearing comprising a second end bearing inner ring arranged coaxially and secured against rotation at a circumference of the second end bearing piece and with a second end bearing outer ring;
   a first end bearing shield accommodating the first end bearing outer ring;
   a second end bearing shield accommodating the second end bearing outer ring, one of the first end rolling-element bearing and the second end rolling-element bearing being a fixed bearing and the other of the first end rolling-element bearing and the second end rolling-element bearing being a floating bearing.

9. A deflecting drum and tensioning drum according to claim 8, wherein the bearing shields are arranged in a slideable manner in a belt tensioning device in longitudinal direction of the conveyor belt.

10. A deflecting drum and tensioning drum according to claim 8, wherein the drum jacket is one integral piece.

11. A drum for a belt conveyor, the drum comprising a drum jacket shaped as a hollow cylinder, the drum jacket comprising:
   a center drum body with a first end flange on a first end and a second end flange on a second end, said center drum body having a center drum body outer diameter;
   a first end bearing piece with a first end bearing piece flange, the first end bearing piece flange being fixed with the first end flange, said first end bearing piece having a first end bearing piece outer diameter;
   a second end bearing piece with a second end bearing piece flange, the second end bearing piece flange being fixed with the second end flange, said second end bearing piece having a second end bearing piece outer diameter, each of said center drum body outer diameter, said first end bearing piece outer diameter and said second end bearing piece outer diameter being equal to one another;
   a first end rolling-element bearing comprising a first end bearing inner ring arranged coaxially and secured against rotation at a circumference of the first end bearing piece and with a first end bearing outer ring;
   a second end rolling-element bearing comprising a second end bearing inner ring arranged coaxially and secured against rotation at a circumference of the second end bearing piece and with a second end bearing outer ring;
   a first end bearing shield accommodating the first end bearing outer ring; and
   a second end bearing shield accommodating the second end bearing outer ring, one of the first end rolling-element bearing and the second end rolling-element bearing being a fixed bearing and the other of the first end rolling-element bearing and the second end rolling-element bearing being a floating bearing.

12. A drum for a belt conveyor according to claim 11, further comprising a drive, wherein:
   the drum is a driving drum; and
   the drive comprises one of slowly running gearless direct drives and electromechanical drives.

13. A drum for a belt conveyor according to claim 11, further comprising a drive, wherein:
   the first end bearing piece is shaped as a hollow cylinder;
   the second end bearing piece is shaped as a hollow cylinder;
   the drive comprises a first end torque motor and a second end torque motor;
   the first end torque motor comprises a first end motor housing with a first end outside stator and a first end inside rotor;
   the second end torque motor comprises a second end motor housing with a second end outside stator and a second end inside rotor;
   the first end outside stator is attached in a fixed manner with the first end motor housing;
   the second end outside stator is attached in a fixed manner with the second end motor housing;
   the first end inside rotor is attached in a manner secured against rotation and detachably to the first end bearing piece that is shaped as a hollow cylinder; and
   the second end inside rotor is attached in a manner secured against rotation and detachably to the second end bearing piece that is shaped as a hollow cylinder.

14. A drum for a belt conveyor according to claim 11, further comprising a drive, wherein:
   the drive comprise electromechanical drives with a first end quickly running electric motor with a first end connected gear having a transmission output operably connected to the first end bearing piece and a second end quickly running electric motor with a second end connected gear having a transmission output operably connected to the second end bearing piece;
   the first end connected gear is operably connected to the first end bearing piece by one of a connecting piece, a flange plugged onto the transmission output, and a coupling; and the second end connected gear is operably connected to the second end bearing piece by one of a connecting piece, a flange plugged onto the transmission output, and a coupling.

15. A drum for a belt conveyor according to claim 11, wherein the drum jacket further comprises an inside reinforcement comprising at least one of welded ridges and bulkhead plates.

16. A drum for a belt conveyor according to claim 11, wherein the center drum body comprises an outside provided with a friction lining forming a running surface of a conveyor belt strap.

17. A drum for a belt conveyor according to claim 11, wherein:
    the drum is a tensioning drum; and
    the bearing shields are arranged in a slideable manner in a belt tensioning device in longitudinal direction of the conveyor belt.

18. A drum for a belt conveyor according to claim 11, wherein the drum jacket is one integral piece.

* * * * *